US 7,603,075 B2

(12) United States Patent
Barda (10) Patent No.: US 7,603,075 B2
(45) Date of Patent: Oct. 13, 2009

(54) TRANSMODULATOR FOR VERY SMALL APERTURE TERMINALS EMPLOYING INTERNET PROTOCOL BASED COMMUNICATIONS

(75) Inventor: Avraham Barda, Hod Ha'Sharon (IL)

(73) Assignee: Ayecka Communication Systems, Ltd., Hod Ha Sharon (IL)

( * ) Notice: Subject to any disclaimer, the term of this patent is extended or adjusted under 35 U.S.C. 154(b) by 218 days.

(21) Appl. No.: 11/470,691

(22) Filed: Sep. 7, 2006

(65) Prior Publication Data

US 2008/0064323 A1    Mar. 13, 2008

(51) Int. Cl.
*H04H 1/00* (2006.01)
*H04B 7/185* (2006.01)
*H04Q 7/20* (2006.01)

(52) U.S. Cl. ............ 455/3.01; 455/428; 455/429; 455/13.1

(58) Field of Classification Search ............ 455/12.1, 455/13.1, 13.2, 427, 428; 725/139
See application file for complete search history.

(56) References Cited

U.S. PATENT DOCUMENTS

| 2002/0026643 | A1* | 2/2002 | Ewen et al. ............ 725/109 |
| 2003/0220072 | A1* | 11/2003 | Coffin, III ............ 455/3.02 |
| 2004/0161031 | A1 | 8/2004 | Kwentus et al. ............ 375/240 |
| 2004/0244059 | A1* | 12/2004 | Coman ............ 725/139 |
| 2005/0125839 | A1* | 6/2005 | Coman ............ 725/115 |
| 2006/0126576 | A1* | 6/2006 | Dale et al. ............ 370/336 |

* cited by examiner

*Primary Examiner*—Tilahun Gesesse
(74) *Attorney, Agent, or Firm*—Fleit Gibbons Gutman Bongini & Bianco PL; Martin Fliet; Paul D. Bianco (57) ABSTRACT

DVB-S/S2 transmodulator for VSAT units employing IP based communication. The transmodulator is optimized for VSAT networks, enabling legacy VSAT units to benefit from the developments of the advanced DVB-S2 standard. The transmodulator appears transparent to the legacy VSAT unit that is configured to operate with the older DVB-S standard. Some embodiments offer a unique feedback channel allowing the transmodulator to send messages and information to the ground station via the VSAT itself.

18 Claims, 6 Drawing Sheets

TRANSMODULATOR FOR VERY SMALL APERTURE TERMINALS EMPLOYING INTERNET PROTOCOL BASED COMMUNICATIONS

FIELD OF THE INVENTION

The present invention relates generally to a transmodulator and more particularly, to a transmodulator for use in Very Small Aperture Terminal (VSAT) units employing Internet Protocol (IP) based communications.

BACKGROUND OF THE PRIOR ART

A transmodulator is an apparatus used in the telecommunication field to convert a signal of a first type of transmission scheme into a signal of a second type of transmission scheme. Specifically, transmission scheme may be any combination of: modulation type coding scheme, encryption scheme, error detection and correction methods and every other feature incorporated in the transmission scheme.

Very Small Aperture Terminal (VSAT) is a satellite communication terrestrial unit that is used for satellite communications of data, voice and video excluding broadcast TV. VSAT units are often located in remote and inaccessible places and sometimes serve as the sole means of communications.

One of the most common uses for VSAT units is to supply Internet connectivity to remote places by configuring the VSAT units to employ Internet Protocol (IP) based communications. Such VSAT IP systems usually take the form of a Star configuration wherein one central location, sometimes referred to as a Satellite Hub, Hub server, Ground Station, or Gateway (hereinafter referred to as: "Hub" or "Hub server") is located in a strategic place, in close proximity to the Internet service provider backbone, while multiple remote VSAT units are scattered under the satellite beam coverage area. Each and every VSAT unit is connected in turn, through resource management units, to the end users. VSAT IP communication may provide very high data transfer rates thus supplying the remote end users, some of them in developing countries having limited means, with high broadband Internet connectivity.

Presently, the common satellite communication standard in use for satellite communication is the DVB-S, with many of the existing VSAT units still employing it. In addition to the DVB-S many other IP-based satellite communication systems operate on non-propriety forward channel formats. For example, systems provided by HNS (Direct Way, IPoS), I-Direct as well as Gilat's Skystar Advantage. The DVB-S and the other non-propriety formats are hereinafter referred to in this application as 'legacy format' or 'legacy signal', and any referral to DVB-S include the non-propriety formats mentioned above and similar ones.

Recently, an advanced standard, the DVB-S2, has been ratified. This standard provides improved spectral efficiency, higher data transfer rate, better error correction methodology and many more benefits. Additionally, the DVB-S2, coming very near to the theoretical channel capacity limit (aka the Shannon limit) may well be the last significant DVB standard to emerge, at least from a data transfer rate perspective.

The problem is that due to important developments made in the DVB-S2, such as different modulation and different error correction schemes, it is not backwards compatible to the legacy standard. Thus, VSAT units employing legacy standards such as the DVB-S may not use it. Consequently, over the years IP service providers will have to replace large numbers of VSAT units in order to enable their end users to receive the new DVB-S2 standard. Needless to say, these replacements are costly and undesirable as the switch to DVB-S2 requires a total equipment replacement.

A dedicated transmodulator may, in certain circumstances, supply the legacy equipment with the required upgrade so that it may enable the use the advanced standard, thus avoiding the costly total equipment replacement.

Transmodulation techniques are already known in the art, including the conversion between the above-mentioned DVB-S2 and the DVB-S standards.

Patent applications US20050125839 and US20040244059 both applied by LSI Logic Corporation, disclose a DVB-S/S2 transmodulator unit providing baseband video signaling for a set-top box local loop connection that may, among other things, implement a continuous one-way communication channel. While addressing the general aspects of DVB-S/S2 transmodulation, these applications focus on broadcast television communication, hence the mentioning of a set-top-box and video signaling equipment. Various aspects of the advanced DVB-S2 standard are not addressed by these applications, specifically the establishment of an IP-based communication channel employing feedback used for quality control of the communication channel. Additionally, these applications require the incoming and outcoming carrier frequency of the modulated signal to be the same another characteristic of broadcast TV.

Patent application US20040161031 discloses a DVB-S/S2 conversion unit, referred to in this application as a signal transcoder. Here also, the transcoder focuses on symbol transfer rates and carrier signal frequencies that are typical to broadcast TV rather than IP based communication. By concentrating on DVB-S/S2 conversion for the use of broadcast TV, some important qualitative and quantitative developments of the advanced DVB-S2 are overlooked and not addressed and so, the conversion offered by this application is narrow and limited and may not be used in IP based communications.

In view of the prior art it would be important to note that while the costs of a DVB-S/S2 transmodulator may top the costs of a new DVB-S2 compatible set-top-box for a TV, the costs of a DVB-S/S2 transmodulator for the use of VSAT unit would be marginal to the costs of a new DVB-S2 compatible VSAT. Therefore, it would be advantageous to have a DVB-S/S2 transmodulator that is optimized for VSAT networks, and is installed in the signal path before the VSAT unit. By this, Internet service providers will be able to reduce the costs of DVB-S2 introduction and the migration process at large will become simple.

SUMMARY OF THE INVENTION

The present invention discloses a DVB-S2 transmodulator for VSAT units employing IP based communication. The transmodulator is optimized for VSAT networks; enabling legacy VSAT units to benefit form the developments of the advanced DVB-S2 standard. In addition, the disclosed transmodulator appears transparent to the legacy VSAT unit that is configured to operate with the legacy formats.

Specifically, said transmodulator comprises a conversion circuitry having a first end and a second end. Said conversion circuitry is functioned to receive an advanced modulated signal via said one end, transmodulate it to a legacy modulated signal and deliver it to said second end.

According to some embodiments of the invention, transmission of feedback information from the transmodulator to the Hub (or a network server) may be achieved by encapsulating the feedback message with a destination address of a network server, such as the Hub's server.

According to other embodiments of the invention, the transmodulator may be implemented with fixed physical parameters such as RF transmission frequency, in order to achieve reduced implementation costs.

According to other embodiments of the invention, BER and RSSI emulation may be provided by the transmodulator to the VSAT according to the actual BER and RSSI in the input of the transmodulator. The emulation shall take into account the quantitative differences, in terms of Eb/No values, between the two standards in what is regarded as low or high BER and RSSI.

According to yet another embodiment of the invention, a transmodulator is supplied with dual configurations. DVB-S2 and a legacy format. This will ease migration to DVB-S2 as VSAT units may be switched from one format to another as necessary. Additionally, this will enable a fail-safe mechanism allowing a quick swap to the legacy format mode of operation in case of any faulty operation of the transmodulator. In the fail-safe mode the transmodulator receives a legacy format and delivers the same format as if no upgrade has been executed.

BRIEF DESCRIPTION OF DRAWINGS

The subject matter regarded as the invention will become more clearly understood in light of the ensuing description of embodiments herein, given by way of example and for purposes of illustrative discussion of the present invention only, with reference to the accompanying drawings, wherein.

The drawings together with the description make apparent to those skilled in the art how the invention may be embodied in practice. No attempt is made to show structural details of the invention in more detail than is necessary for a fundamental understanding of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DESCRIPTION OF SOME EMBODIMENTS OF THE INVENTION

An embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "one embodiment", "an embodiment", "some embodiments" or "other embodiments" means that a particular feature, structure, or characteristic described in connection with the embodiments is included in at least one embodiments, but not necessarily all embodiments, of the inventions.

It is understood that the phraseology and terminology employed herein is not to be construed as limiting and are for descriptive purpose only. The principles and uses of the teachings of the present invention may be better understood with reference to the accompanying description, figures and examples. It is to be understood that the details set forth herein do not construe a limitation to an application of the invention.

Furthermore, it is to be understood that the invention can be carried out or practiced in various ways and that the invention can be implemented in embodiments other than the ones outlined in the description below.

It is to be understood that the terms "including", "comprising", "consisting" and grammatical variants thereof do not preclude the addition of one or more components, features, steps, or integers or groups thereof and that the terms are to be construed as specifying components, features, steps or integers.

The phrase "consisting essentially of", and grammatical variants thereof, when used herein is not to be construed as excluding additional components, steps, features, integers or groups thereof but rather that the additional features, integers, steps, components or groups thereof do not materially alter the basic and novel characteristics of the claimed composition, device or method.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described. Methods of the present invention may be implemented by performing or completing manually, automatically, or a combination thereof selected steps or tasks.

The term "method" refers to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only. Meanings of technical and scientific terms used herein are to be commonly understood as by one of ordinary skill in the art to which the invention belongs, unless otherwise defined.

The present invention can be implemented in the testing or practice with methods and materials equivalent or similar to those described herein.

The terms "bottom", "below", "top" and "above" as used herein do not necessarily indicate that a "bottom" component is below a "top" component or that a component that is "below" is indeed "below" another component or that a component that is "above" is indeed "above" another component. As such, directions, components or both may be flipped, rotated, moved in space, placed in a diagonal orientation or position, placed horizontally or vertically or similarly modified. Accordingly, it will be appreciated that the terms "bottom", "below", "top" and "above" may be used herein for exemplary purposes only, to illustrate the relative positioning or placement of certain components, to indicate a first and a second component or to do both.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

The present invention discloses a DVB-S2 transmodulator for VSAT units employing IP based communication. The transmodulator is optimized for VSAT networks, enabling legacy VSAT units to benefit from the developments in the advanced DVB-S2 standard. In addition, the disclosed transmodulator appears transparent to the legacy VSAT unit that continues to send legacy format signals back to the Hub.

According to some embodiments of the invention, the transmodulation is executed by a processing unit coupled to a DVB-S2 demodulator and a legacy format modulator. According to the invention, a processing unit is regarded as any electronic means for performing the required conversion between the DVB-S2 standard into the legacy format. The processing unit may take the form of one component, be it an FPGA, an ASIC or a microprocessor or a combination of a plurality of such components. The processing unit may or may not include the DVB-S2 demodulator, legacy format modulator, or both. In addition, the processing unit may comprise the analog units required for transmodulation or only the digital ones. A person having ordinary skills in the art will note that the term "processing unit" describes the operational rather than the structural nature of the circuit and therefore should be broadly interpreted to include all the possible embodiments as mentioned above.

Figure 1:
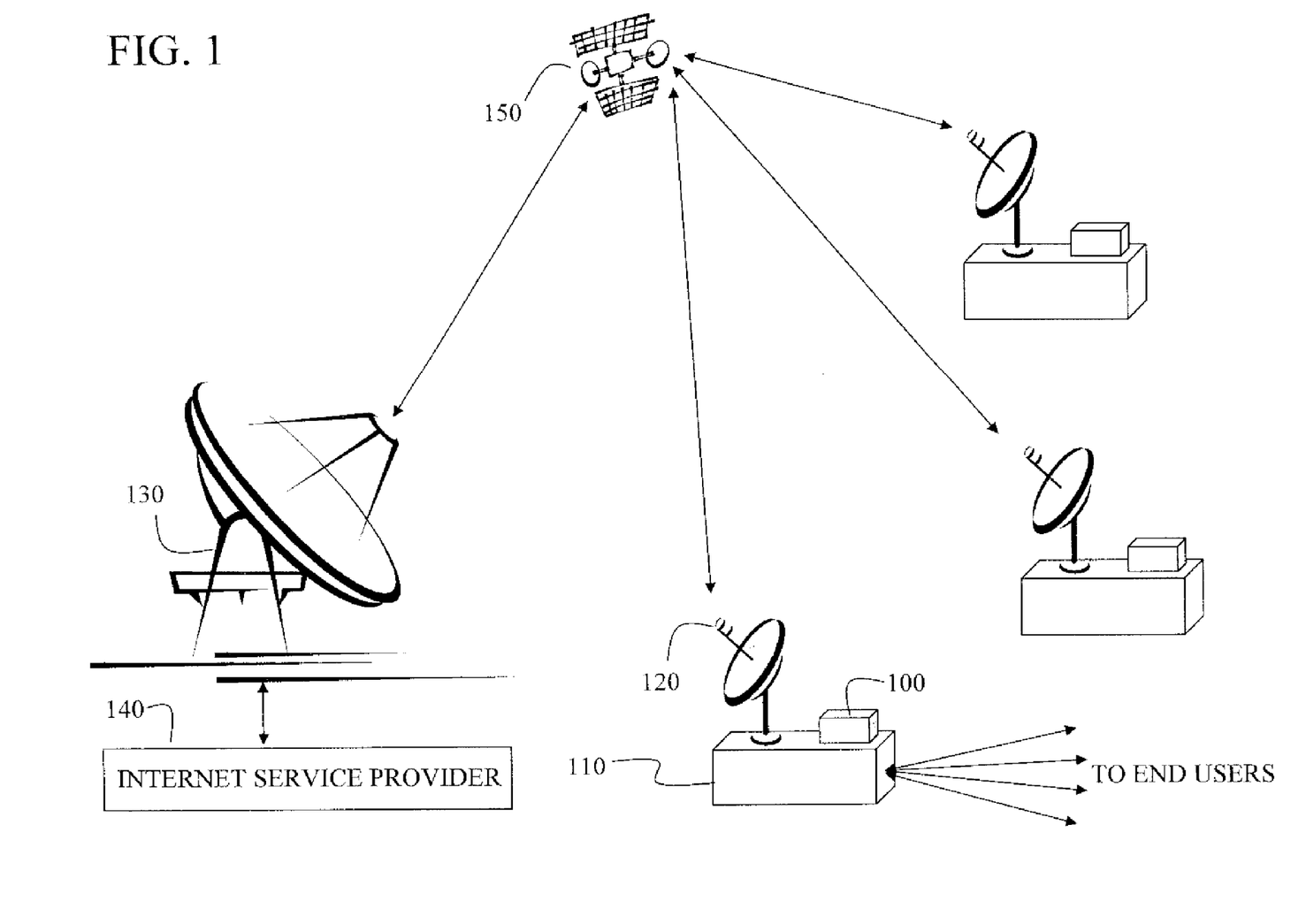
FIG. 1 depicts the environment in which the transmodulator operates.

Referring to FIG. 1, the environment of the transmodulator is depicted. The transmodulator 100 is mounted on or within the legacy VSAT unit 110 and is connected on ones end to a Low Noise Block (LNB) 120 and to the VSAT circuitry on the other end. A plurality of VSAT units 110 are scattered under the beam of a communication satellite 150, which in turn, communicates with a ground station 130 which is connected to the Internet service provider 140.

Figure 2:
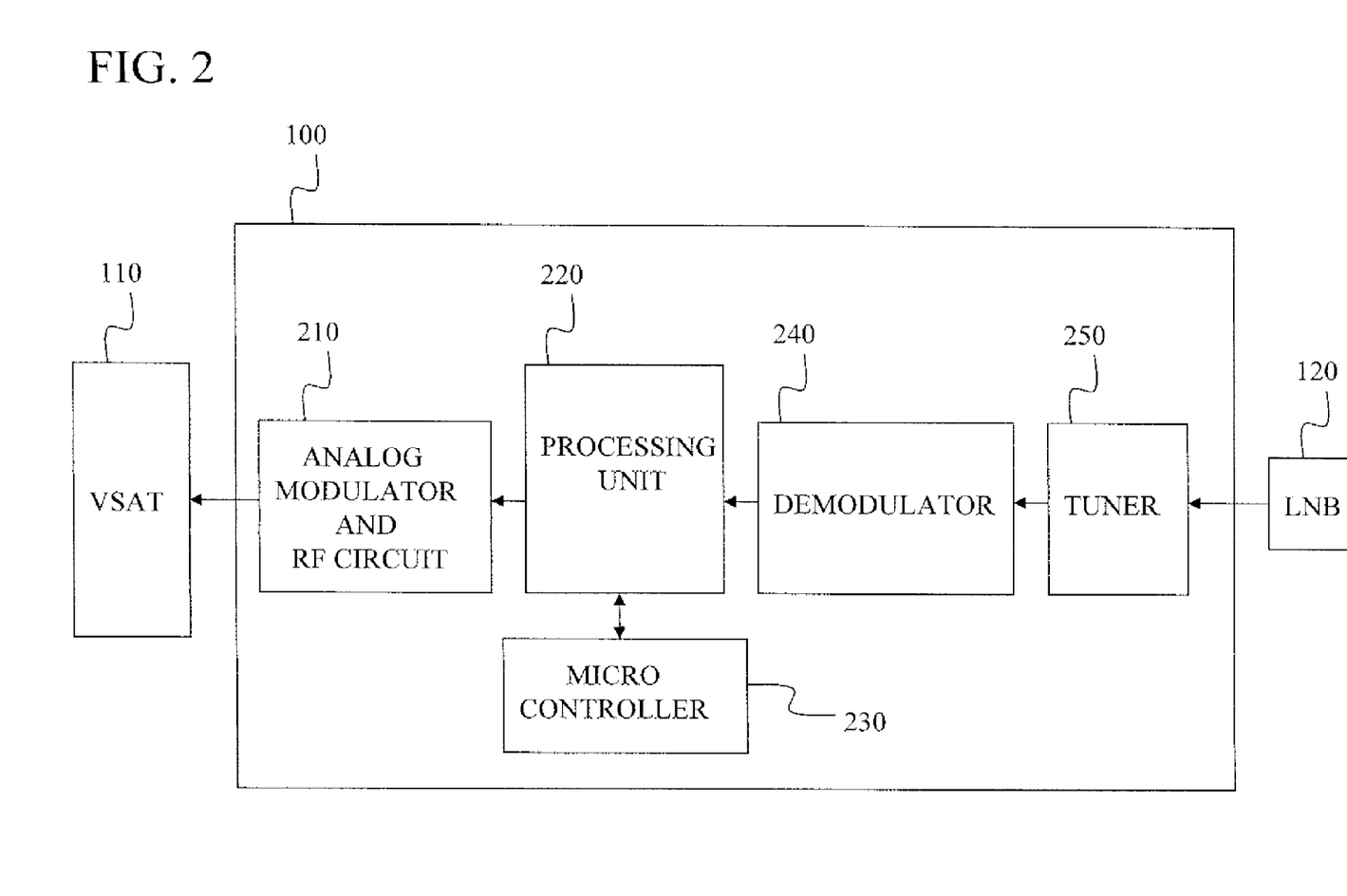
FIG. 2 is a simplified schematic block diagram of the transmodulator.

Turning now to FIG. 2, the structure of one embodiment of the transmodulator 100 is depicted in a simplified block diagram. The transmodulator 100 comprises a tuner 250, coupled to a demodulator 240, coupled in turn to a processing unit 220 which is coupled to a modulator 210 and to a micro controller 230; The demodulator 240 is configured to demodulate the DVB-S2 signal arriving from said LNB 120 through the tuner 250 and deliver it to the processing unit 220 being controlled by said micro controller 230. The modulator 210 is configured to modulate a signal arriving from the processing unit 220 into a legacy format such as DVB-S and subsequently deliver it to the VSAT 110 circuitry.

According to some embodiments of the invention, and in order to keep the implementation costs of the transmodulator low, the transmodulator may operate with certain predefined fixed parameters. These parameters may include, but are not limited to: carrying signal frequency, symbol rate, code rate and output power. In order to allow compatibility with as much legacy VSAT units as possible. The fixed symbol rate, for example, will be chosen so that it is supported by all old VSAT equipment actually deployed. As there are two main types of VSAT systems deployed, some support symbol rates up to 45 Msps, and others support only symbol rates up to 30 Msps, the transmodulator according to this embodiment shall have an output symbol rate set to approximately 27 Msps.

As a result of the fixed symbol rate, several problems may arise. For example, the input symbol rate for the transmodulator, being a DVB-S2 input signal may reach 45 Msps whereas the output, in case of an older version VSAT, may be as low as 27 Msps. Therefore the transmodulator must compensate for that, by means of filtering only the data directed to the VSAT, and deleting data that is not relevant. According to one embodiment of the invention, this is achieved by means of PID (Package Identifier) filtering, and potentially MAC filtering. In other words, the transmodulator comprises a PID processing unit that enables it to assist the VSAT in filtering out the non-relevant PIDs, thus lowering the data transfer rates that actually gets to the VSAT. Another case where the difference in data rates requires transmodulator adjustments is when the input rate is smaller then the output rate, e.g. input rate of 10 Msps, and output rate of 27 Msps. According to this embodiment of the invention the transmodulator will be required to generate null packets to fill-in the higher data rate at its output.

According to other embodiments of the invention, the transmodulator is configured to operate with variable parameters. The transmodulator may deliver the transmodulated signal to the VSAT in any frequency on the legitimate range (which is 950 MHz to 2150 MHz). According to this embodiment of the invention, the transmodulator may generate any symbol rate and code rate. Thus, when installing the transmodulator in the VSAT, it is tuned to the current parameters of the VSAT, on both ports. Once installed, it locks to the DVB-S signal and generates a DVB-S signal with exact same parameters. No tuning is required for the VSAT.

Once the transmodulator installed in the VSAT locks, the VSAT continue to operate as before. Once the entire cluster of VSAT units is upgraded into VSAT units with transmodulators, the Internet service provider may change the transmitted signal into DVB-S2, with new parameters (it then can change the central frequency, symbol rate, etc.) and subsequently the transmodulator locks to the new parameters.

According to some embodiments of the invention the transmodulator input port has a dual configuration: a DVB-S2 configuration and a legacy format configuration. The transmodulator may be switched to legacy or DVB-S2 formats as necessary enhancing flexibility to the VSAT with the transmodulator installed. Clearly, this will ease the migration process as the improved VSAT (with the installed transmodulator) may still operate in the legacy format until the rest of the transmodulators are installed in the VSAT units.

According to some embodiments of the invention the transmodulator is configured to send back information to the Hub, despite the fact that the transmodulator does not transmit directly to the satellite. Feedback information regarding the channel quality, for example, is one of the features of the DVB-S2 standard that is not supported by the legacy formats, specifically the DVB-S. The ability to send back information becomes possible due to the use of IP addressing methodology.

Figure 3:
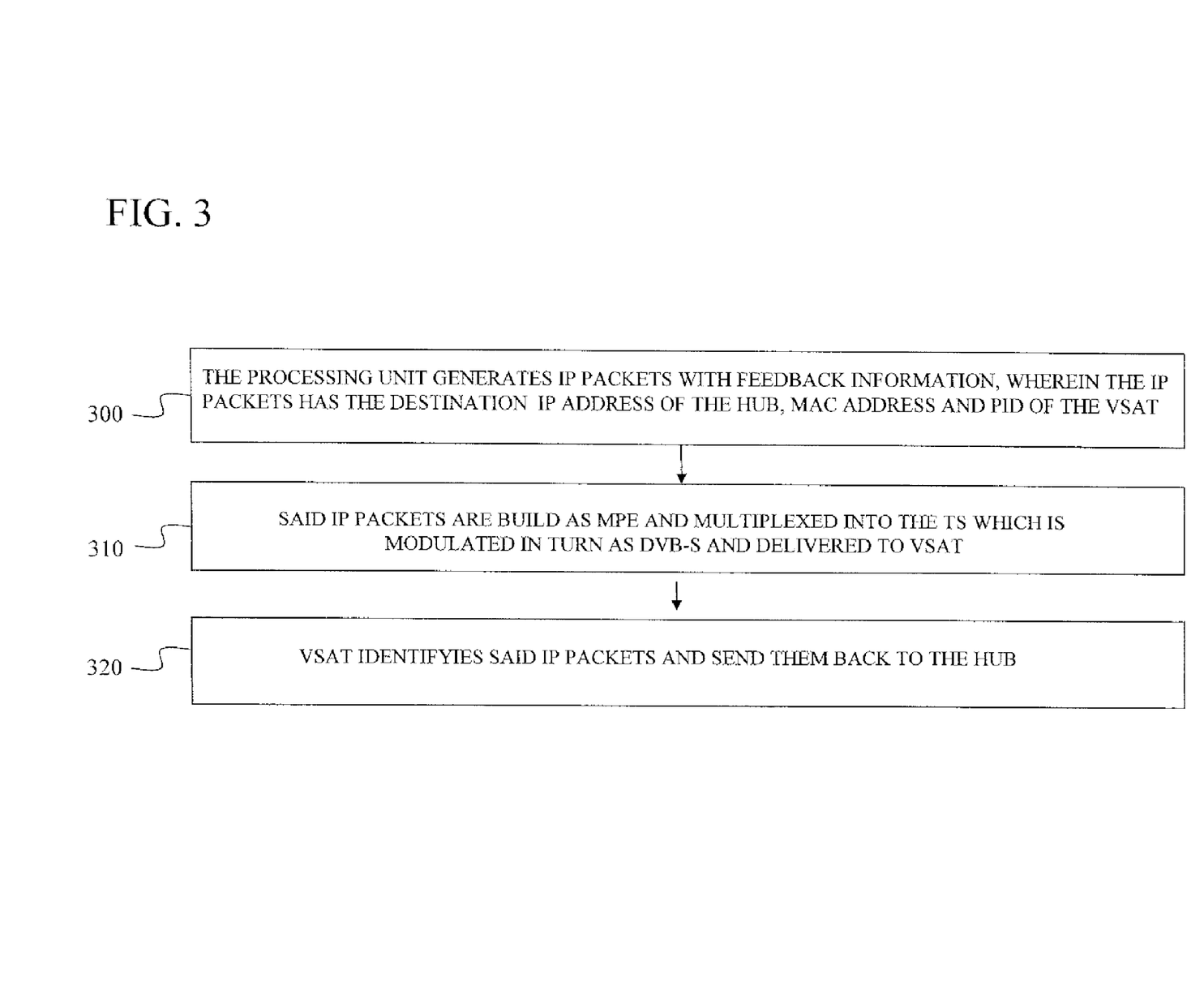
FIG. 3 is a flow chart diagram showing how the transmodulator sends back information to the Hub.

Turning now to FIG. 3, a flowchart depicts the way a transmodulator sends feedback information back to the Hub via the VSAT. First, as the transmodulator is able to generate IP packets, it generates packets with the destination IP address of the destination address (or ID address) of the Hub (or a network server), and the MAC address of the VSAT, including the PID used by the VSAT for receiving information 310. Then, and due to compatibility with DVB-S, the packet will be built as a MPE (recognized by DVB-S) packet, and will be multiplexed into the Transport Stream (TS), which in turn is modulated and transmitted as a DVB-S signal to the VSAT 320. Subsequently, the VSAT identifies the packet in its normal process (having its MAC address and the PID it is tuned to). The TCP infrastructure of the VSAT identifies the destination address of the packet, and routes it back to the Hub, via its return channel, thus creating a feedback channel 330.

According to some embodiments of invention, the information transmitted by the transmodulator via said feedback channel may include: Sending ACM messages, acknowledging configuration of the transmodulator according to the configuration downloaded to it, reporting status and errors, alarms etc., reporting RSSI and BER and reporting internal parameters. The establishment of the feedback channel is achieved by using the VSAT to transmit IP packets generated by the transmodulator, without the VSAT knowing the transmodulator is connected before it.

According to another embodiment of the invention, the transmodulator, being configured to appear transparent to the VSAT unit, may generate a 22 KHz signal delivered directly to the LNB. This is performed in order to simulate the way a legacy VSAT selects the frequency band of the LNB.

Installing a transmodulator between the LNB and the VSAT other circuitry prevents the VSAT from sending the Hub server information concerning the downlink channel quality. Specifically, VSAT systems usually measure the Received Signal Strength Indication (RSSI). The RSSI may be used to help tuning a tracking antenna (some VSAT systems use a tracking antenna, e.g. on ships and vessels), or it may be used just to report the receive status of the VSAT to the VSAT management system. Another parameter that is used for monitoring is the BER (Bit Error Rate), or alternatively the FER (Frame Error Rate). FER and BER can also be deduced according to RS error correcting code reports, such as number of error corrected packets received, or other reports. RSSI and BER/FER are affected by the link status. For example, when it rains above the VSAT, there will be a degradation of RSSI and BER. In case the antenna is not well aligned the RSSI a BER will degrade, etc. As the transmodulator is installed between the LNB and VSAT, and it generates the DVB-S signal received by the VSAT, the VSAT loses its ability to measure the actual RSSI and BER. As a matter of fact, the VSAT with the transmodulator installed will always measure a fixed RSSI, and excellent BER as there are no noise sources between the TM to the VSAT, no rain (they are connected by cable) etc.

According to some embodiments of the invention, the transmodulator may provide the Hub server with information concerning the downlink channel quality. Specifically it may supply information regarding RSSI, BER, FER, and SNR. This may be done via the feedback channel described above.

According to another embodiment of the invention, the transmodulator will listen to the Hub messages to the VSAT, SNMP messages or any other type of messages, containing requests for BER/FER or RSSI feedback, will replace the message with null information, and will generate the report as if the VSAT has generated the report. The report message shall be send via the feedback channel.

According to another embodiment of the invention, the hub server will be configured to send specific messages to the transmodulator, replacing the older messages used to probe the VSAT BER/FER or RSSI. The transmodulator will listen to the new type of messages, and report the BER/FER or RSSI to the Hub server via the feedback channel describes above.

According to another embodiment of the invention, the transmodulator will measure the BER/FER or RSSI. The transmodulator will physically degrade the quality of the DVB-S modulated signal, delivered to the VSAT. Thus emulating the signal quality received by the transmodulator. The BER /FER degradation will be done in a manner that it will generate errors and apply them only to data not aimed for the VSAT connected to the transmodulator. The VSAT measures BER/FER on the entire signal, however, it uses only a fraction of the data (only IP packets destined to it). Therefore we can degrade the BER without destroying useful packets of the VSAT. This embodiment of the invention is advantageous, since there is no modification, change or addition to the VSAT system, or the VSAT system protocol. Sending back the feedback of BER/FER or RSSI is preformed by the VSAT itself— like it has been done prior to the transmodulator installation.

The BER degradation can be done either by manipulating the demodulated data after the DVB-S2 receiver, or before the DVB-S modulator on the Transport Stream (TS), According to other embodiments of the invention, the complete signal provided to the VSAT is degraded, by emulating the BER/FER or RSSI. This can be done by manipulation of the TS, or by adding a noise diode to the circuit, or by any other method that degrade the quality of the signal.

Figure 4:
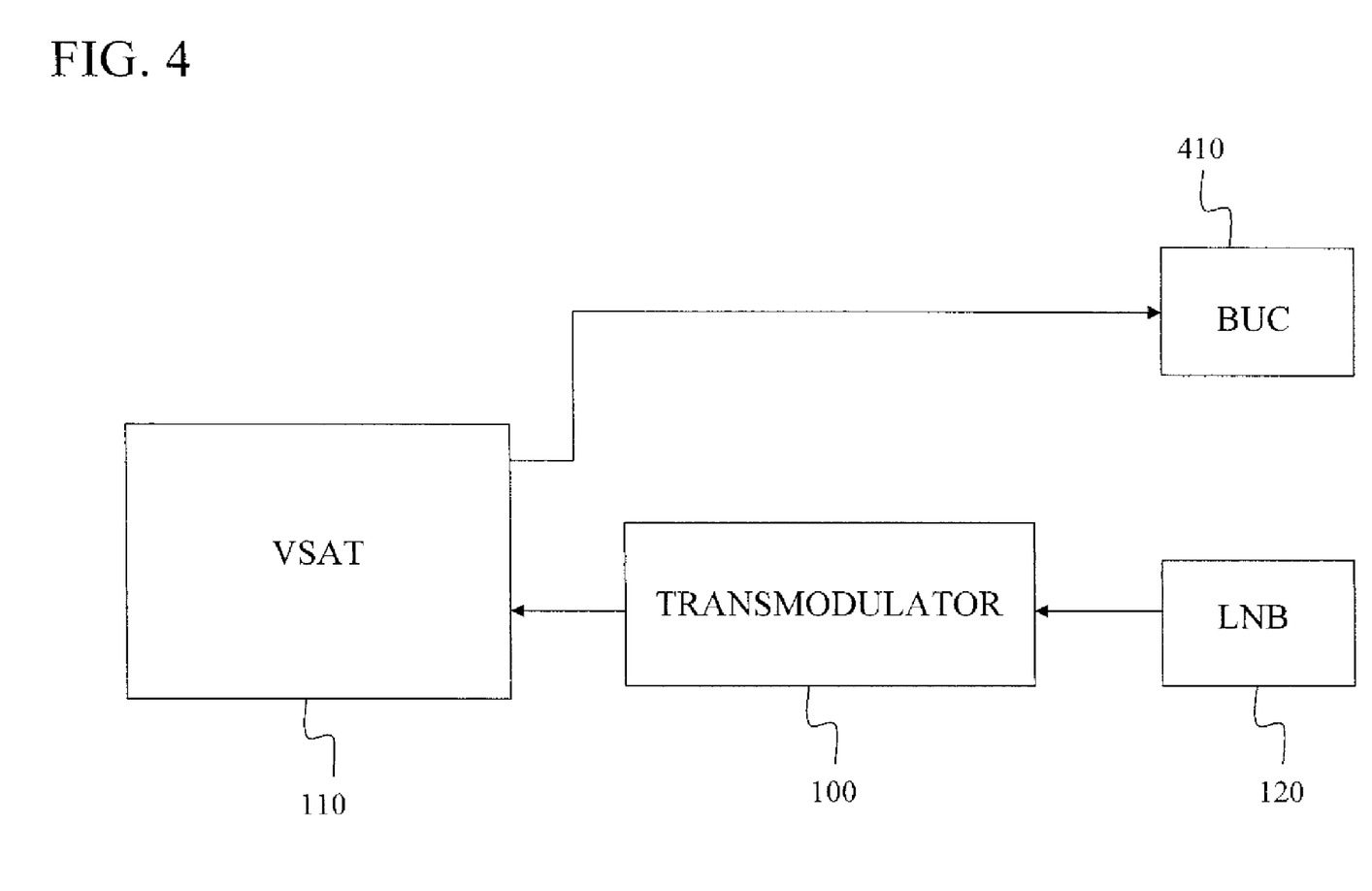
FIG. 4 is a schematic block diagram of the VSAT and the transmodulator, showing where the steps of the feedback process take place.

Turning now to FIG. 4, a schematic block diagram shows where each step of the said feedback channel process takes place. Specifically, the process of sending hack RSSI measurements is described. First, RSSI measurements are performed at the point where the DVB-S2 signal arrives from the LNB 120 to the transmodulator 100.

Then, the information regarding the RSSI is modified and emulated into equivalent RSSI information in a legacy format. The processing unit 220 in the transmodulator 100 executes this stage. Then, still in the processing unit 220, the message constructing and encapsulating is performed as explained above (FIG. 3). Then the encapsulated message is modulated into a legacy format (such as DVB-S) and delivered to the VSAT 110. From the VSAT the IP messages regarding the RSSI are forwarded to the HUB via the BUC 410.

Figure 5:
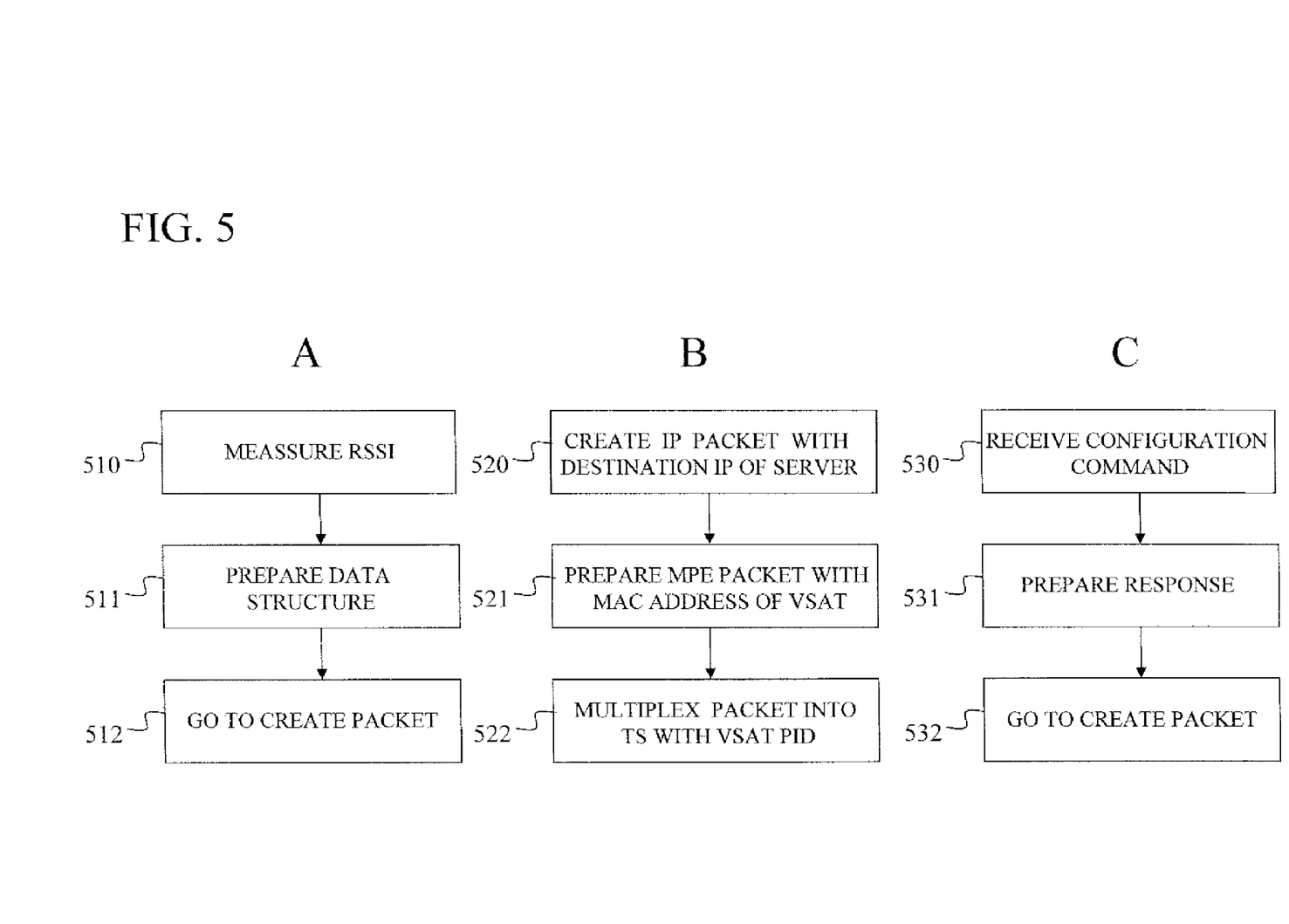
FIG. 5 shows three different examples for information sent back by the transmodulator.

FIG. 5 shows 3 examples for different uses of the above-mentioned feedback mechanism. In example A, RSSI is measured 510, data structure is prepared 511 and an TP packet is created 512. In example B, The transmodulator initiates a message. An IP packet is created with the destination ID of the HUB 520, MAC address 521 and multiplexed with the PID of the VSAT into the TS 522. In example C, the transmodulator receives a command to change configuration 530. Then the response is prepared 531 and an IP packet is created 532.

According to other embodiments of the invention, the transmodulator will have multiple sets of configuration. For example, it may have a current set, describing the current parameters of the signal it locks to. And a new set of parameters, describing the next signal to lock to. It may have multiple such sets of parameters.

During first installation, the system is operating with DVB-S. Only after all the transmodulators are installed the Internet service provider switches to DVB-S2. Therefore, each transmodulator installed is locked to the DVB-S signal first (current set of parameters). Once installation is complete, DVB-S modulator at the Hub is replaced with a DVB-S2 modulator (or if the current modulator supports DVB-S2, it is just configured to transmit DVB-S2 format). Once this is done, all transmodulator units lose lock. Then after a timeout period, the transmodulators try the second set of parameters, and hopefully they succeed. Once they succeed, they lock to the DVB-S2, and service is restored. After a while, the service provider may decide to increase (or decrease) the service, by increasing the symbol rate of the DVB-S2. Alternatively it receives a better offer for use of satellite resources from another satellite, and so the DVB-S2 parameters have to be changed. Once the Internet service provider configures the new set of parameters, in all the transmodulators units, it changes the parameters of the DVB-S2 modulator, to the new frequency, symbol rate etc. Again, the transmodulators lose lock, and after timeout period they try the new set, until they succeed. This leads to a need in remote configuration.

According to other embodiments of the invention the transmodulator will be able to receive remote configuration via the satellite link. The remote configuration command will be integrated into IP packet and transmitted over the DVB-S2 or integrated directly into DVB-S2 MPEG packets. In case of IP over DVB-S2 IP packets with configuration information will be sent to the transmodulator. The transmodulator, will filter those packets, analyze the data and use it for its own configuration. IP packets may be encapsulated to the DVB-S2 using MPE, ULE or Generic stream methods. In case of MPEG packets, the transmodulator will be able to receive a specific PID, with special table, encapsulating the configuration information.

According to another embodiment of the invention, the transmodulator has a fail-safe mode. As the transmodulator is a single point of failure, it may be bypassed in case it does not operate properly or does not operate at all. The bypass directly connects the input to the output, and the VSAT may operate at its legacy mode.

Figure 6:
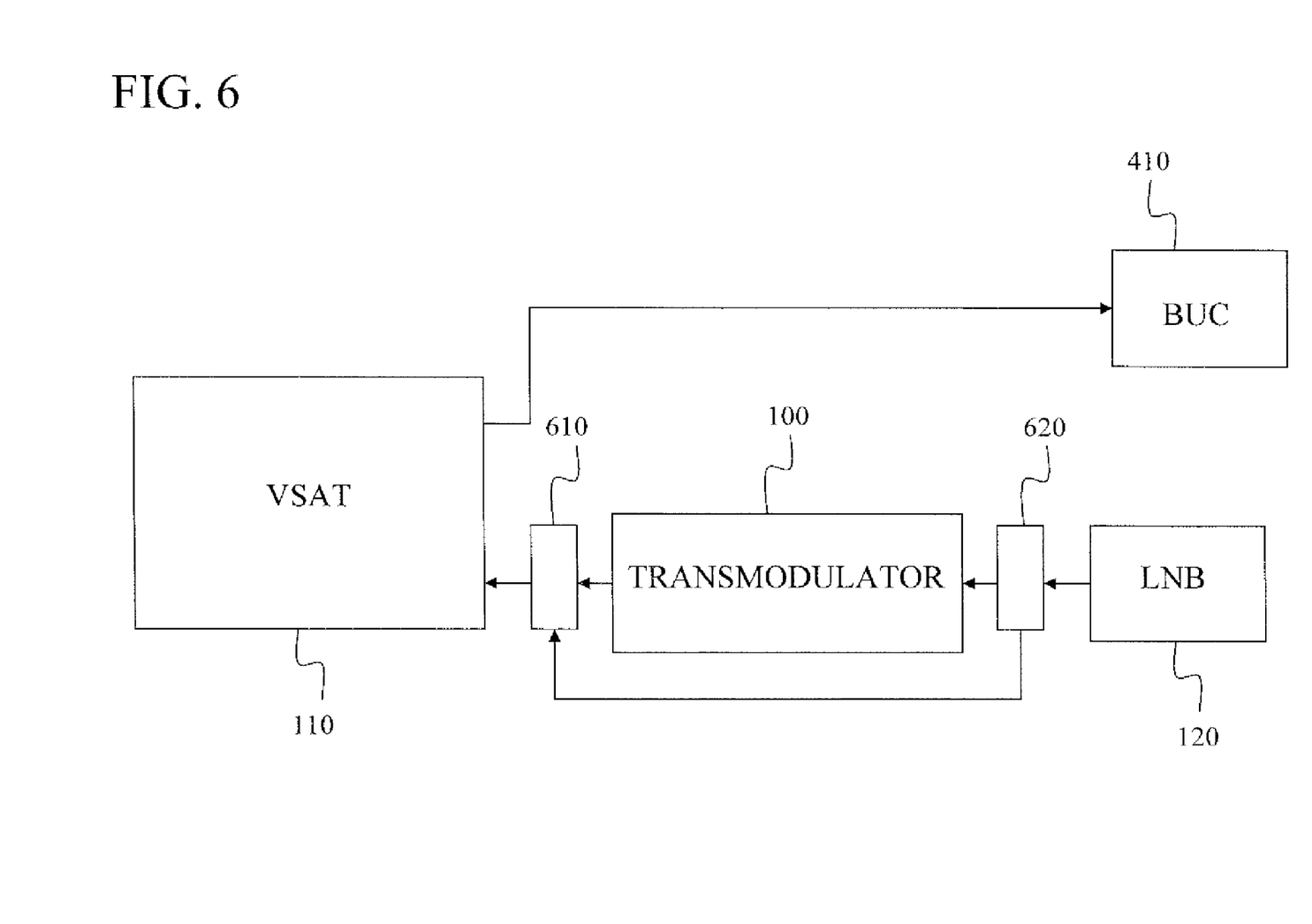
FIG. 6 shows a schematic block diagram of the fail-safe configuration.

Turning now to FIG. 6, a schematic block diagram depicts the above-mentioned fail-safe mechanism. According to this embodiment, the transmodulator further comprises a first switch 610 and a second switch 620, both configured to divert the incoming signal from the LNB 120 and bypass the conversion circuitry of the transmodulator 100 on the way to the VSAT 110 whenever necessary. Specifically, the switches 610 and 620 are operated according to a control signal whose source may be either external or the transmodulator itself. When operating on a failsafe configuration, a signal coming from the LNB 120 is diverted by a first switch 620 to a second switch 610 and from there to the VSAT 110 and finally the BUC 410. Upon switching to the fail-safe configuration, the transmodulator further supplies the VSAT with its old parameters that have been retained in a storage unit prior to the installation of the transmodulator, for quick configuration of the VSAT.

According to other embodiments of the invention, the transmodulator will parse all MPEG-2 Program Specific Information (PSI) and DVB Service information (SI) to extract all information necessary for it functionality—including channel parameters from the Network Information Table (NIT) table.

According to other embodiments of the invention the processing unit in the transmodulator is capable of receiving each of the following formats: MPE, ULE (Ultra Light Encapsulation) and Generic stream, and translate them into MPE to be compatible with the VSAT connected to it. This is done because DVB-S2 supports multiple formats for delivering IP traffic whereas the DVB-S supports only MPE.

According to other embodiments of the invention the transmodulator supports the Adaptive Code and Modulation (ACM) feature present in the DVB-S2 standard and lacking in DVB-S. ACM is the ability to change the modulation and code rate for each VSAT according to the receiving conditions of the VSAT. For example, if a VSAT is under heavy rain conditions, which reduce the signal quality, the DVB-S2 allows for changing the signal modulation transmitted to that particular VSAT to a more robust modulation, and more robust code rate. To be able to do that, each VSAT has to report the signal quality it receives (RSSI and/or BER/FER). The DVB-S VSAT units are not designed to do that, since DVB-S does not support ACM. Specifically, the transmodulator, by measuring signal quality may generate channel quality information and send it back to the Hub station, the way it send back messages and information as explained above, for the use of ACM at the Hub server.

While the invention has been described with respect to a limited number of embodiments, these should not be construed as limitations on the scope of the invention, but rather as exemplifications of some of the embodiments. Those skilled in the art will envision other possible variations, modifications, and applications that are also within the scope of the invention. Accordingly, the scope of the invention should not be limited by what has thus far been described, but by the appended claims and their legal equivalents. Therefore, it is to be understood that alternatives, modifications, and variations of the present invention are to be construed as being within the scope and spirit of the appended claims.

What is claimed is:

1. A transmodulator for a Very Small Aperture Terminal (VSAT) employing Internet Protocol (IP) based communication, said transmodulator comprising:

a processing unit;

a legacy format modulator;

a DVB-S2 demodulator;

wherein said processing unit is coupled to said legacy format modulator and to said DVB-S2 demodulator, and wherein said legacy format modulator is coupled to the VSAT circuitry and said DVB-S2 demodulator is coupled to the VSAT unit's Low Noise Block (LNB); and wherein said DVB-S2 demodulator is configured to demodulate DVB-S2 signal arriving from said LNB and deliver it to said processing unit and wherein said legacy format modulator is configured to modulate signal coming from said processing unit into a legacy format signal and deliver it to the VSAT circuitry, wherein said transmodulator is coupled to the VSAT in a fixed parameters configuration, wherein said parameters include at least one of: carrying signal frequency, symbol rate, code rate, output power, and wherein the fixed parameters are configured such that the configuration enables the transmodulator to remain operable upon parameters change of a service provider in operative association with the VSAT.

2. The transmodulator according to claim 1, further comprising a noise diode and wherein said noise diode is configured to inject noise to the signal delivered to said VSAT thus simulating the Signal to Noise Ratio (SNR) in the signal coming from said LNB, and wherein said noise level is determined according to the BER measured by said processing unit, and wherein the transmodulator uses the noise diode to generate noise at a DVB-S output of the transmodulator representing a clean DVB-S output of the transmodulator, thereby enabling the VSAT receiver to measure the correct SNR value of the satellite channel, that is only seen by the input port of the transmodulator.

3. The transmodulator according to claim 1, wherein said processing unit is further configured to send feedback information to the Hub server regarding the DVB-S2downlink channel quality, and wherein said sending of feedback information is achieved by encapsulating said feedback information into packets having at least one of the following: ID destination of the Hub server, PID of said VSAT, MAC address of said VSAT, wherein the encapsulation of the feedback information pertaining to the downlink channel quality is arranged such that the feedback information is measured by the transmodulator independently of the VSAT unit, and wherein the feedback information is encapsulated within a signal transmitted by the VSAT unit such that the encapsulated feedback information is transparent to the VSAT unit.

4. The transmodulator according to claim 3, wherein said processing unit is further configured to send an IP message to the Hub server, wherein said sending of an IP message is achieved by encapsulating said message in packets having at least one of the following: ID destination of the Hub server, PID of said VSAT, MAC address of said VSAT.

5. The transmodulator according to claim 4, wherein said message is a response to a message sent by said Hub server to said VSAT, and wherein the transmodulator captures the message sent to the VSAT unit and responds instead of the VSAT unit.

6. The transmodulator according to claim 4, wherein said message includes at least one of the following: feedback information, monitoring information, status information, configuration approval, signal lock, power up, local control, local changes performed, wherein the feedback information is encapsulated to bypass the VSAT and find its way back to the hub, thus eliminating the need to get the feedback from the VSAT.

7. The transmodulator according to claim 4, wherein said message is an indication of at least one of the following processes: software upgrade, switching between two different configurations, reception of new configuration command.

8. The transmodulator according to claim 3, wherein said feedback information includes at least one of the following: signal quality parameters, an SNR measurement, an RSSI measurement, a BER measurement.

9. The transmodulator according to claim 3, wherein said channel properties information is sent for the purpose of performing Adaptive Coding and Modulation (ACM) by said Hub server, wherein the encapsulation of the channel properties is arranged such that the channel properties are measured by the transmodulator independently of the VSAT unit, and wherein the channel properties are encapsulated within a signal transmitted by the VSAT unit such that the encapsulated said channel properties information is transparent to the VSAT unit.

10. The transmodulator according to claim 3, wherein said channel properties information is sent for the purpose of at least one of the following: reporting loss of signal, identifying potential problems, indicating the quality of the signal received by said transmodulator, generating SNMP traps for a higher level NMS system.

11. The transmodulator according to claim 1, wherein said transmodulator generates a signal of approximately 22 KHz delivered to said LNB, and wherein said signal is used to determine LNB polarity in accordance with said transmodulator configuration.

12. The transmodulator according to claim 1, wherein said transmodulator has at least two configuration, wherein each configuration represent a legacy VSAT configuration, and wherein each configuration include at least one of the following properties carrier signal frequency, symbols rate, code rate, type of signal.

13. The transmodulator according to claim 12, further configured to have a fail-safe mode, wherein as a response to a control signal the transmodulator is bypassed and the VSAT operates in the manner it has operated prior to the transmodulator installation.

14. A transmodulator for a Very Small Aperture Terminal (VSAT) employing Internet Protocol (IP) based communication, said transmodulator comprising:

a processing unit;
a legacy format modulator;
a DVB-S2 demodulator;
wherein said processing unit is coupled to said legacy format modulator and to said DVB-S2 demodulator, and wherein said legacy format modulator is coupled to the VSAT circuitry and said DVB-S2 emodulator is coupled to the VSAT unit's Low Noise Block (LNB);
and wherein said DVB-S2 demodulator is configured to demodulate DVB-S2 signal arriving from said LNB and deliver it to said processing unit and wherein said legacy format modulator is configured to modulate signal coming from said processing unit into a legacy format signal and deliver it to the VSAT circuitry,
wherein said transmodulator is coupled to a VSAT in a fixed parameters configuration, wherein said parameters include at least one of: carrying signal frequency, symbol rate, code rate, output power,
wherein the symbols rate is fixed and wherein said processing unit is configured to match symbols rate by filtering out incoming packets having a PID (Package Identifier) different from the PID of at least one of the following: PID of said VSAT, PID of a server coupled to said VSAT, PID of an end user coupled to said VSAT.

15. A transmodulator for a Very Small Aperture Terminal (VSAT) employing Internet Protocol (IP) based communication, said transmodulator comprising:

a processing unit;
a legacy format modulator;
a DVB-S2 demodulator;
wherein said processing unit is coupled to said legacy format modulator and to said DVB-S2 demodulator, and wherein said legacy format modulator is coupled to the VSAT circuitry and said DVB-S2 demodulator is coupled to the VSAT unit's Low Noise Block (LNB);
and wherein said DVB-S2 demodulator is configured to demodulate DVB-S2 signal arriving from said LNB and deliver it to said processing unit and wherein said legacy format modulator is configured to modulate signal coming from said processing unit into a legacy format signal and deliver it to the VSAT circuitry,
wherein said transmodulator is coupled to a VSAT in a fixed parameters configuration, wherein said parameters include at least one of following: carrying signal frequency, symbol rate, code rate, output power,
wherein the symbols rate is fixed and wherein said processing unit is configured to match symbols rate by adding null packets as required.

16. A transmodulator for a Very Small Aperture Terminal (VSAT) employing Internet Protocol (IP) based communication, said transmodulator comprising:
- a processing unit;
- a legacy format modulator;
- a DVB-S2 demodulator;
- wherein said processing unit is coupled to said legacy format modulator and to said DVB-S2 demodulator, and wherein said legacy format modulator is coupled to the VSAT circuitry and said DVB-S2demodulator is coupled to the VSAT unit's Low Noise Block (LNB); and wherein said DVB-S2 demodulator is configured to demodulate DVB-S2 signal arriving from said LNB and deliver it to said processing unit and wherein said legacy format modulator is configured to modulate signal coming from said processing unit into a legacy format signal and deliver it to the VSAT circuitry,
- wherein said processing unit is configured to measure the RSSI at the input of said DVB-S2 demodulator, and subsequently generate packets holding said RSSI information, wherein said RSSI information is emulated and takes into account the quantitative differences between DVB-S2 and the legacy standard, and wherein said packets are combined with the RSSI delivered to the VSAT circuitry via said DVB-S modulator.

17. A transmodulator for a Very Small Aperture Terminal (VSAT) employing Internet Protocol (IP) based communication, said transmodulator comprising:
- a processing unit;
- a legacy format modulator;
- a DVB-S2 demodulator;
- wherein said processing unit is coupled to said legacy format modulator and to said DVB-S2demodulator, and wherein said legacy format modulator is coupled to the VSAT circuitry and said DVB-S2demodulator is coupled to the VSAT unit's Low Noise Block (LNB); and wherein said DVB-S2 demodulator is configured to demodulate DVB-S2 signal arriving from said LNB and deliver it to said processing unit and wherein said legacy format modulator is configured to modulate signal coming from said processing unit into a legacy format signal and deliver it to the VSAT circuitry wherein said processing unit is further configured to perform error correction and yet generate and apply errors, wherein said error generation takes into account the quantitative differences, in terms of Eb/No values, between DVB-S2 and the legacy standard in respect to BER, and wherein said generated errors are applied only to packets not having a PID of one of the following: PID of said VSAT, PID of a server coupled to said VSAT, PID of end users coupled to said VSAT.

18. A transmodulator for a Very Small Aperture Terminal (VSAT) employing Internet Protocol (IP) based communication, said transmodulator comprising:
- a processing unit;
- a legacy format modulator;
- a DVB-S2 demodulator;
- wherein said processing unit is coupled to said legacy format modulator and to said DVB-S2 demodulator, and wherein said legacy format modulator is coupled to the VSAT circuitry and said DVB-S2 demodulator is coupled to the VSAT unit's Low Noise Block (LNB); and wherein said DVB-S2demodulator is configured to demodulate DVB-S2 signal arriving from said LNB and deliver it to said processing unit and wherein said legacy format modulator is configured to modulate signal coming from said processing unit into a legacy format signal and deliver it to the VSAT circuitry,
- and wherein the transmodulator is further configured to have a fail-safe mode, wherein as a response to a control signal the transmodulator is bypassed and the VSAT operates in the manner it has operated prior to the transmodulator installation
- wherein the transmodulator keeps the parameters of the VSAT prior to the transmodulator installation in a storage unit, for a quick configuration of the VSAT in the fail-safe mode,
- wherein said transmodulator has at least two configuration,
- wherein each configuration represent a legacy VSAT configuration, and wherein each configuration include at least one of the following properties carrier signal frequency, symbols rate, code rate, type of signal.

* * * * *